E. E. THOMPSON & W. H. WALLACE.
TRACTION WHEEL.
APPLICATION FILED JUNE 17, 1909.

955,295.

Patented Apr. 19, 1910.

2 SHEETS—SHEET 1.

E. E. THOMPSON & W. H. WALLACE.
TRACTION WHEEL.
APPLICATION FILED JUNE 17, 1909.

955,295.

Patented Apr. 19, 1910.
2 SHEETS—SHEET 2.

Witnesses

Inventors
E. E. Thompson &
W. H. Wallace,
By Beeler & Cook
Attorneys

UNITED STATES PATENT OFFICE.

ELMER E. THOMPSON AND WILLIAM H. WALLACE, OF CHESTER, OKLAHOMA.

TRACTION-WHEEL.

955,295. Specification of Letters Patent. Patented Apr. 19, 1910.

Application filed June 17, 1909. Serial No. 502,752.

*To all whom it may concern:*

Be it known that we, ELMER E. THOMPSON and WILLIAM H. WALLACE, citizens of the United States, residing at Chester, in the county of Woods and State of Oklahoma, have invented certain new and useful Improvements in Traction-Wheels, of which the following is a specification.

The invention relates to improvements in traction wheels designed for use in connection with automobiles, traction engines, harvesting machinery, and wherever a wheel of this character is designed for the purpose of preventing slipping whether because of soft earth, sand, or mud.

The invention is hereinafter fully described and claimed and illustrated in the accompanying drawings, in which—

Figure 1:
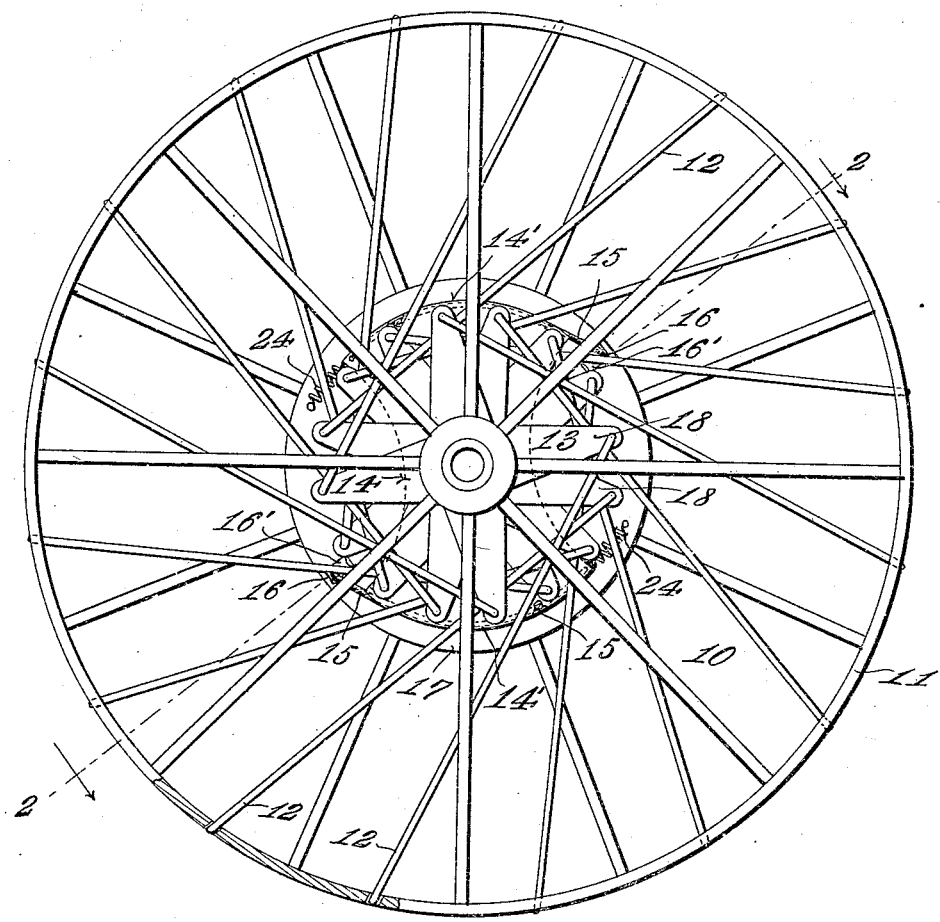
Figure 2:
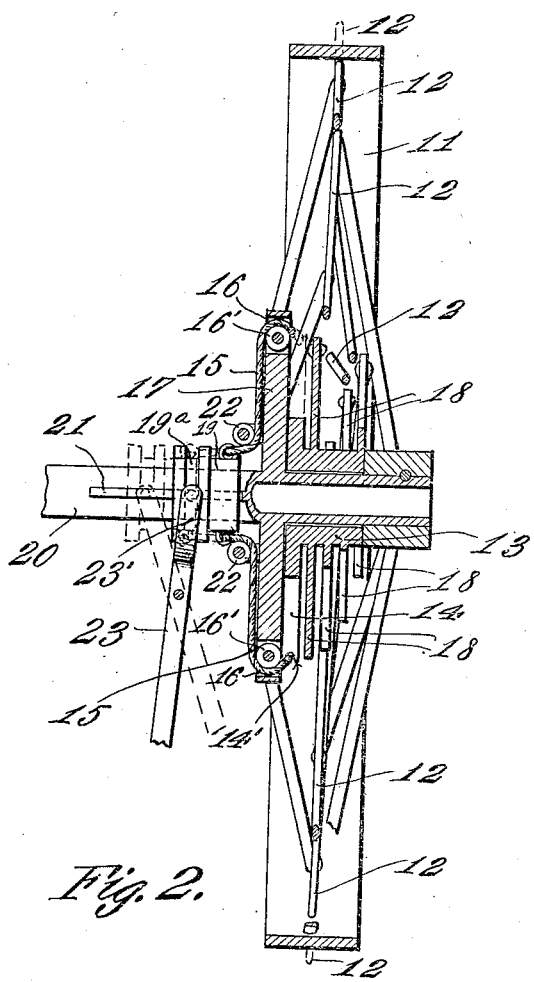
Figure 3:
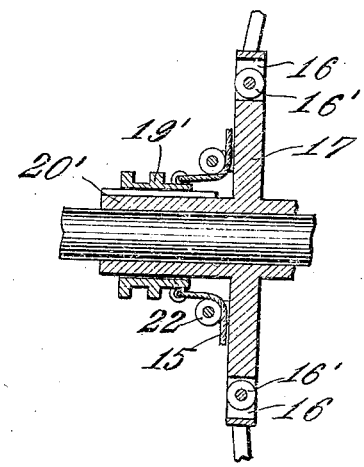
Figure 4:
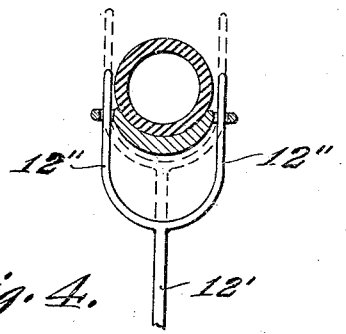

Figure 1 is a view in elevation of a preferred form of the invention; Fig. 2 is a sectional view substantially on the line 2—2 of Fig. 1; Fig. 3 is a modified form of the invention, and Fig. 4 is a transverse sectional detail of the invention as applied to a pneumatic wheel.

Throughout the following detail description and on the several figures of the drawings similar parts are referred to by like reference characters.

At 10 is indicated a traction wheel of a solid rim construction and through whose rim 11 there are a series of spurs or spikes 12 adapted to be projected so as to make positive contact with the road on which the wheel is driven. In lieu of the methods that have heretofore been used for projecting the spurs beyond the rim of the wheel for a similar purpose a spider 13 is provided mounted concentrically with respect to the axis of the wheel. Said spider includes a segmental disk 14 having preferably arc-shaped extremities 14' to each of which extremities is connected a flexible connection indicated as a cable 15, the attachment of said connection being at one end of the arc and the cable 15 operating in a groove along the periphery 14' and thence passing through an opening 16 in the disk 17, constituting a portion of the wheel 10. The spider furthermore includes a series of arms 18 indirectly connected rigidly with the disk 14 for movement therewith through the medium of the tubular portion of the spider. The spurs 12 are pivotally connected to the outer ends of the several arms 18 and extend preferably tangentially therefrom through the rim 11. Upon rotation of the spider 13, therefore, with respect to the wheel 10, the spurs 12 will be projected more or less beyond the periphery of the wheel.

As a convenient means for rotating the spider as above indicated, the cables 15 are fastened to a hub 19 mounted slidably on the axle 20 but prevented from rotation thereon as by a spline 21. It will be understood in this instance that the wheel 10 is rotated from the axle 20. The hub 19 is movable longitudinally on the axle 20 and away from the wheel 10. The cables 15 are preferably guided over direction pulleys 16' and 22. Any suitable means may be provided for moving the hub 19 as above indicated, such means being shown as a lever 23 whose fork 23' embraces the hub at its groove 19ª. Whenever it is necessary to project the spurs the lever may be operated by any suitable means to cause the operation of the parts above described. Upon release of the operating means the spider 13 will be restored to its normal retracted position by automatic means, illustrated and as in the form of coil springs 24 connected to the disk 17 and to the member 14, the normal tendency of which is opposed to the direction of draft on the cables 15.

As indicated in Fig. 4 instead of the spurs 12 projecting through a solid rim it may be desirable in some instances to provide the spurs 12' with forked extensions 12'' which straddle the rim or tire and especially if the latter is of the pneumatic type. The general construction and operation of the device will be the same in both instances.

When it is desired to employ this operating device for the spurs in connection with a wheel mounted to be driven around a stationary axle, as indicated in Fig. 3 an extension 20' is made to surround the axle and on which extension the hub 19' will operate slidably in the same manner as described above in connection with the hub 19 and shaft 20.

Having thus described the invention but without desiring to be limited thereto except as may be required by the state of the art, what is claimed as new is:

1. The hereindescribed traction wheel comprising a rim, a spider rotatable concentrically with respect to the wheel, a segmental disk including a tubular portion formed on said spider, a series of arms projecting radially from the spider and rigidly secured to said tubular portion, a series of spurs extending tangentially from the ends of said arms and thereby being projected by the periphery of said rim, a hub mounted to rotate with the wheel, a flexible connection extending from the spider to said hub, and means to move the hub laterally with respect to the wheel to cause rotation of the spider.

2. The hereindescribed traction wheel comprising a rim, a spider mounted to rotate concentrically with the axis of the wheel, said spider including a disk, a tubular portion and a series of arms connected to said tubular portion and extending radially from the axis thereof, a series of spurs pivotally connected to the ends of the arms and extending therefrom tangentially beyond the periphery of the rim, flexible connections attached to the periphery of said spider, a hub mounted for rotation with the wheel and slidable laterally thereon and to which said flexible connections are secured, and means for sliding said hub to cause rotation of the spider.

3. The hereindescribed traction wheel comprising a rim, a spider mounted within the wheel and rotatable with respect thereto, said spider including a series of radial arms rigidly secured to a tubular portion formed on said spider, a series of spurs pivotally connected to the outer ends of said arms and extending tangentially therefrom by the periphery of said rim, a hub rotatable with the wheel and slidable laterally with respect thereto, a flexible connection between the spider and said hub, means to operate the hub laterally to cause rotation of the spider through said connection, and means to automatically restore the spider to normal position upon release of said operating means.

4. The hereindescribed traction wheel comprising a rim, a spider mounted within the wheel and rotatable with respect thereto, said spider including a segmental disk, having a groove in the periphery thereof, a tubular portion and a series of radial arms secured to said tubular portion, a plurality of spurs pivotally connected to the outer ends of said arms and extending tangentially therefrom by the periphery of said rim, a grooved hub rotatable with the wheel and slidable laterally with respect thereto, a flexible connection between the hub and the segmental disk, means to operate said hub laterally and rotate the spider, and means to restore the spider to normal position upon the release of said operating means.

5. The hereindescribed traction wheel comprising a rim, a spider mounted within the wheel and rotatable with respect thereto, said spider including a segmental disk, having a groove in the periphery thereof, a tubular portion and a series of radial arms rigidly secured to said tubular portion, a plurality of forked spurs pivotally connected to the outer ends of said arms and extending tangentially therefrom by the periphery of the rim, a grooved hub rotatable with the wheel and slidable laterally with respect thereto, a flexible connection between the hub and the segmental disk, said connection being housed in the peripheral groove of the said disk, means for operating said hub laterally and rotate the spider, and means to restore the spider to normal position upon the release of said operating means, consisting of springs secured to the wheel and the disk.

In testimony whereof we affix our signatures in presence of two witnesses.

ELMER E. THOMPSON.
WILLIAM H. WALLACE.

Witnesses to Elmer E. Thompson:
G. D. GATES,
W. J. UNDERWOOD.

Witnesses to William H. Wallace:
W. L. REED,
ANTONE DUTRA.